United States Patent
Tsuge et al.

[11] Patent Number: 5,941,591
[45] Date of Patent: Aug. 24, 1999

[54] FOLDABLE DEVICE FOR A RECLINE SEAT OF AN AUTOMOBILE

[75] Inventors: Yoshikatsu Tsuge; Katsuyuki Kawai; Hironobu Suzuki, all of Nagoya, Japan

[73] Assignee: Chuo Hatsujo Kabushiki Kaisha, Aichi-ken, Japan

[21] Appl. No.: 08/719,629

[22] Filed: Sep. 25, 1996

[30] Foreign Application Priority Data

Sep. 25, 1995 [JP] Japan .................................... 7-246414
Nov. 17, 1995 [JP] Japan .................................... 7-300293

[51] Int. Cl.⁶ ........................................................ B60N 2/12
[52] U.S. Cl. ............................................................. 296/65.09
[58] Field of Search ............................ 296/65.08, 65.09, 296/65.17, 65.18

[56] References Cited

U.S. PATENT DOCUMENTS

| | | | |
|---|---|---|---|
| 4,484,776 | 11/1984 | Gokimoto et al. .................... | 296/65.09 |
| 4,627,656 | 12/1986 | Gokimoto et al. .................... | 296/65.09 |
| 5,393,116 | 2/1995 | Bolsworth et al. ................... | 296/65.09 |

FOREIGN PATENT DOCUMENTS

| | | | |
|---|---|---|---|
| 63-134829 | 9/1988 | Japan ............................... | B60N 1/10 |
| 3-68130 | 7/1991 | Japan ............................... | B60N 2/36 |

*Primary Examiner*—Gary C. Hoge
*Attorney, Agent, or Firm*—Sughrue, Mion, Zinn, Macpeak & Seas, PLLC

[57] ABSTRACT

In a foldable device for an automobile recline seat, a back rest reclining member is provided to lock the back rest and to release the back rest to rotate forward under the function of the back rest urging member. A seat lock-up cable is connected at one end to the seat locking member and the other end to an actuator member. A back rest lock-up cable is connected at one end to the back rest reclining member and the other end to the actuator member, the actuator member including an actuator lever and an auxiliary lever. A timing mechanism is provided to sequentially actuate the actuator lever and the auxiliary lever so as to pull the back rest lock-up cable and the seat lock-up cable in turn, releasing the back rest reclining member and the seat locking member respectively to rotate the back rest forward by the back rest reclining member and rotating the seat forward around the front arm of the frame by an action of the urging member.

4 Claims, 10 Drawing Sheets

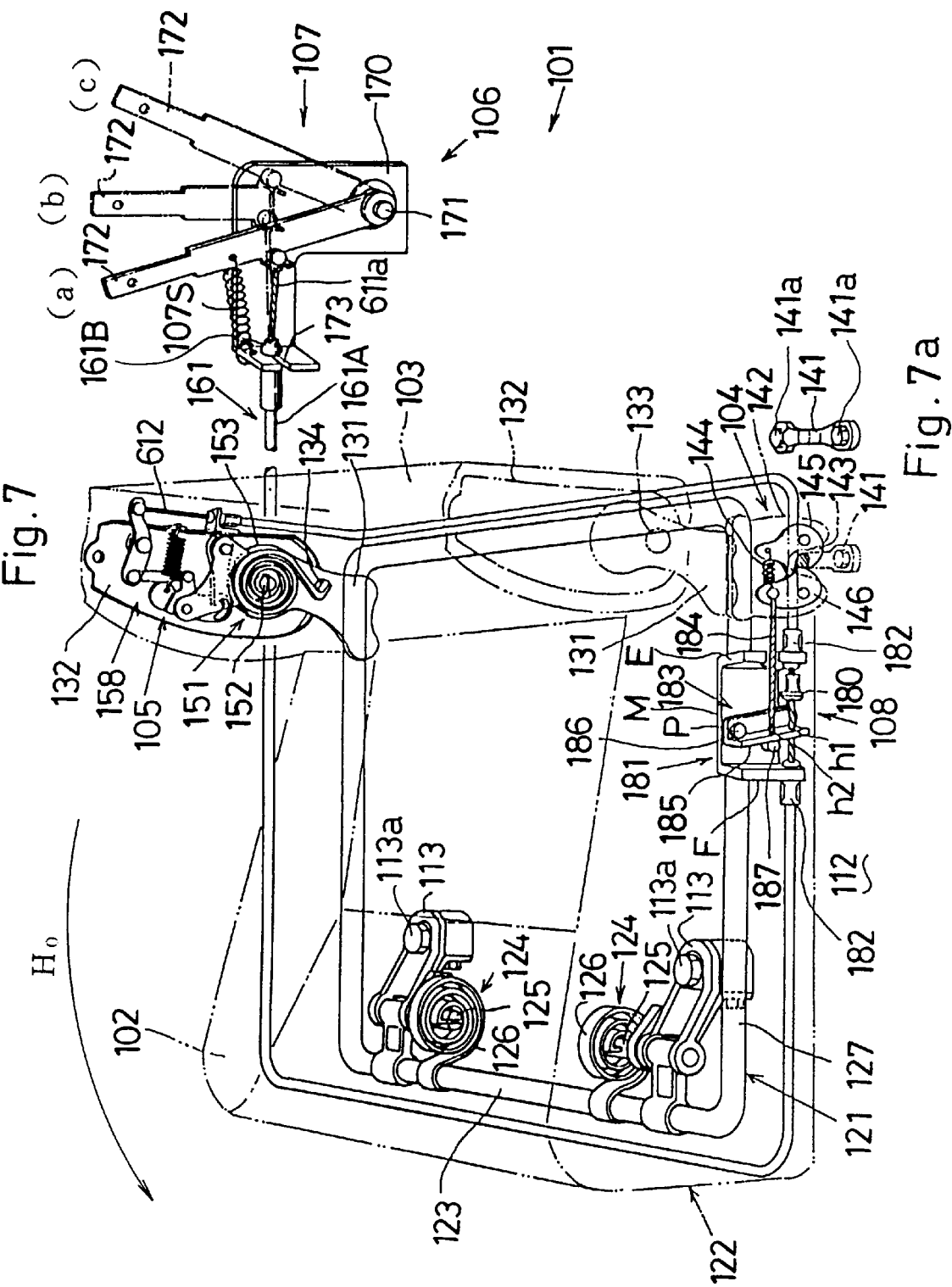

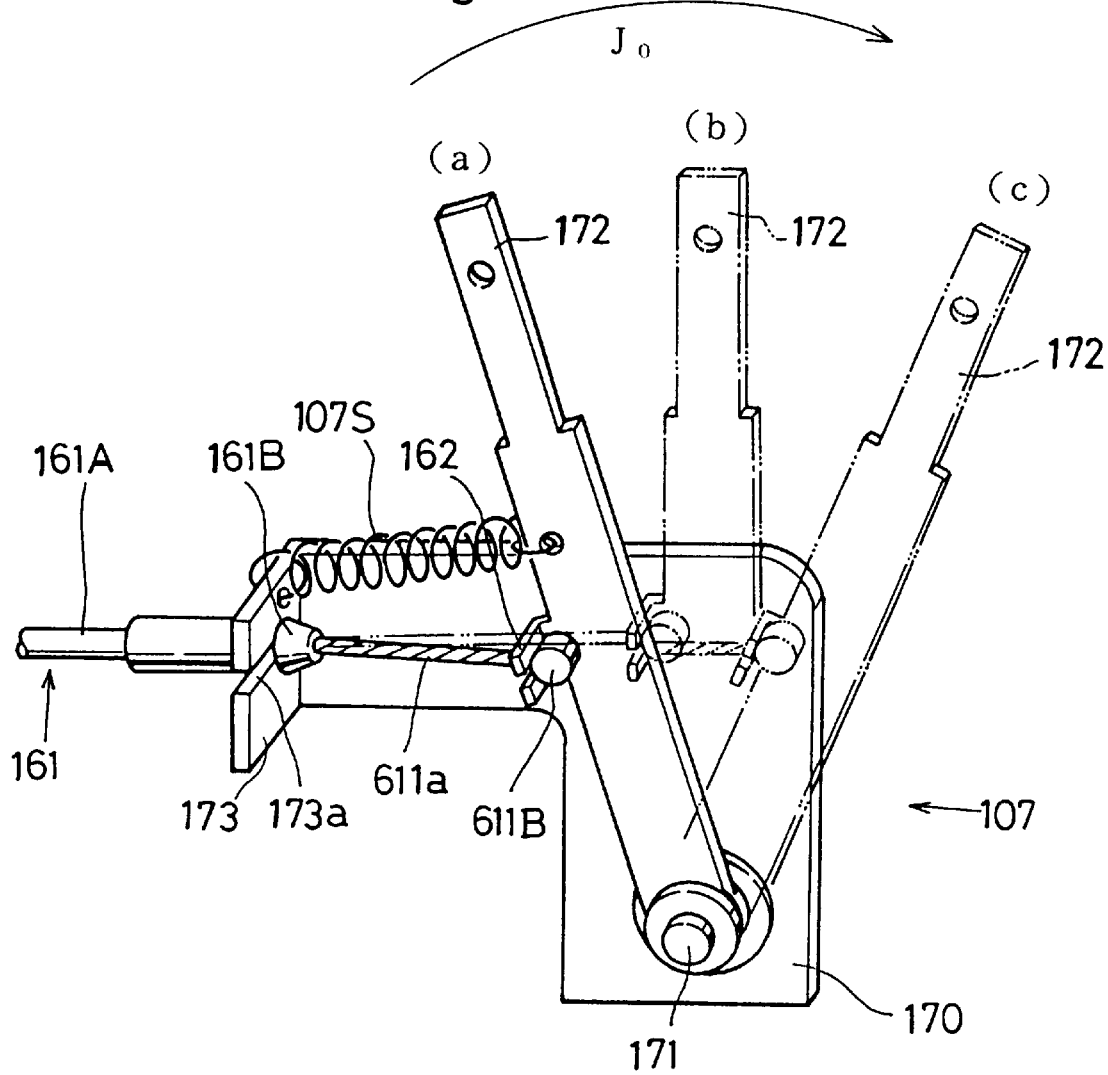

FOLDABLE DEVICE FOR A RECLINE SEAT OF AN AUTOMOBILE

BACKGROUND OF THE INVENTION

FIELD OF THE INVENTION

This invention relates to a foldable device which folds a back rest of a recline seat for an automobile by means of teleoperation.

In this type of the foldable device for a recline seat of an automobile, an operation of a lever makes a back rest fall on a recline seat, and further rolling the seat upright with the back rest attached to the seat so as to effectively utilize a back seat compartment within the automobile. For the sake of convenience, it is desirable to actuate the foldable device from a driver's seat or a rear door with a single operation without inviting a redundant space for the foldable device.

Therefore, it is an object of the invention to provide a foldable device for a recline seat of an automobile which is capable of folding a back rest to overlie on a recline seat mounted on a back seat or middle seat compartment with a single operation within a limited space.

SUMMARY OF THE INVENTION

According to the present invention, there is provided a foldable device for a recline seat which is provided on a floor of an automobile, the seat having a back rest rotationally provided around a hinge on a rear portion of the seat: the foldable device for the recline seat comprising: an urging means provided between the seat and its back rest so as to urgingly rotate the back rest forward around the hinge; a seat locking means provided to removably mount the rear portion of the seat on the floor of the automobile; a back rest urging means provided between the seat and the back rest so as to urgingly rotate the back rest forward; a back rest locking means provided to removably mount the seat on the back rest; a seat lock-up cable connected at one end to the back rest locking means and the other end to an actuator means; a back rest lock-up cable connected at one end to the back rest locking means and the other end to the actuator means; and a timing means provided to sequentially actuate the seat lock-up cable and the back rest locking means.

According to another aspect of the present invention, the actuator means is an operative lever provided on a driver seat or in the proximity of a back door of an automobile.

According to still another aspect of the present invention, the timing means serves as a play provided at a connection between the actuator means and one end of an inner cable of the seat lock-up cable.

According to other aspect of the present invention, there is provided a foldable device for a recline seat which is provided on a floor of an automobile, the seat having a back rest rotationally provided to be urged around a hinge on a rear portion of the seat: the foldable device for the recline seat comprising: an urging means provided between the seat and its back rest so as to urgingly rotate the back rest forward around the hinge; a seat locking means provided to removably mount the rear portion of the seat on the floor of the automobile; a back rest urging means provided between the seat and the back rest so as to urgingly rotate the back rest forward; a lock releasing means provided to unlock the seat locking means and the back rest urging means; the lock releasing means comprising: the lock releasing cable connected at one end to the back rest locking means; an actuator means connected to one end of the lock releasing cable so as to operatively pull the lock releasing cable; and a follower means connected to the seat locking means so as to release the seat locking means in combination with the lock releasing cable after a back seat locking means has been released.

With an operation of the actuator lever, the back rest falls on the seat, and then the seat rolls upright with the back rest overlying on the seat. With the actuator lever mounted on the driver's seat and the back door, it is possible to fold the back seat comfortably with a single operation of the actuation lever. It is to be observed that the foldable device may be applied to a seat mounted on a front or middle compartment within the automobile.

These and other objects and advantages of the invention will be apparent upon reference to the following specification, attendant claims and drawings.

BRIEF DESCRIPTION OF THE DRAWINGS

FIG. 7 is a schematic view of the foldable device for the recline seat of the automobile in the back seat compartment FIG. 7a is a perspective view of a metal hook with which a cross bar usually engages;

FIG. 10 is a perspective view of an actuator lever.

DETAILED DESCRIPTION OF THE EMBODIMENTS

Figure 1A:
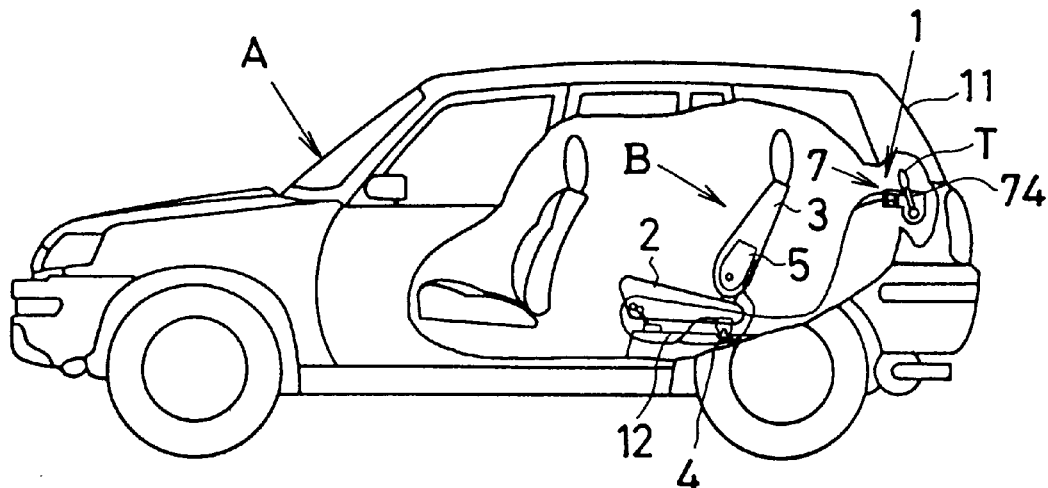
FIGS. 1a–1c are schematic views of a foldable device for a recline seat of an automobile in a back seat compartment according to a first embodiment of the invention.
Figure 1B:
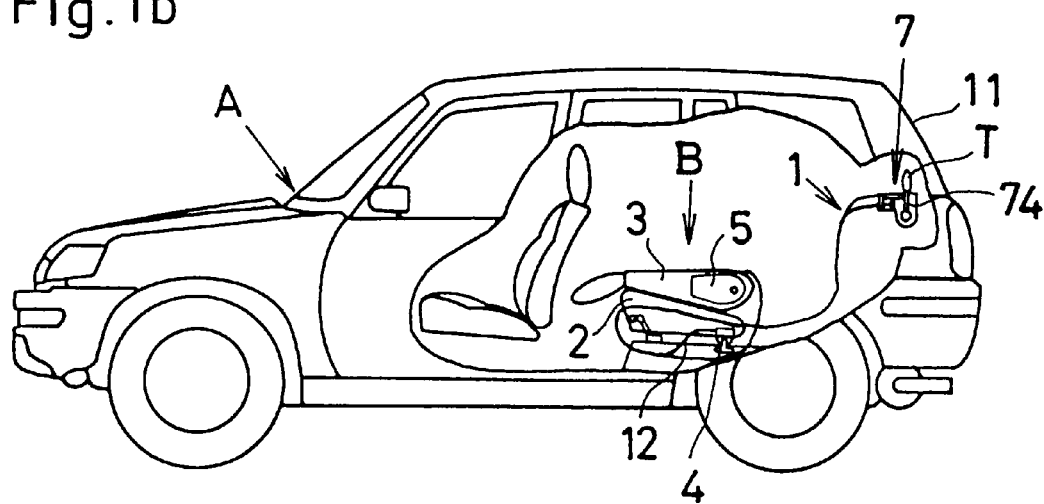
Figure 1C:
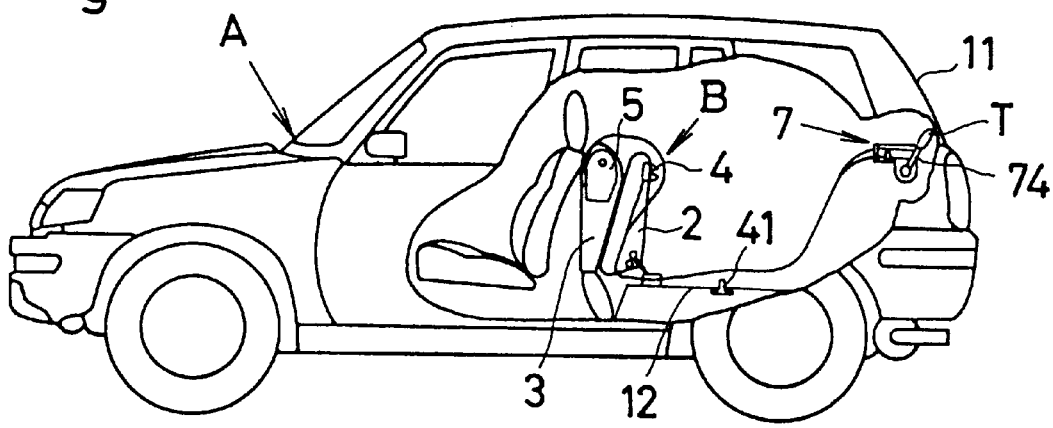

Referring to FIGS. 1a–1c which shows a hatch-back type automobile (A) according to a first embodiment of the invention, a foldable device 1 is applied to a back seat (B) within a back seat compartment of the five door automobile. The back seat (B) has a seat 2 mounted on a floor 12 of the automoble and having a back rest 3 which tiltablly moves rearward to form a reclining seat structure.

Figures 2, 2A:
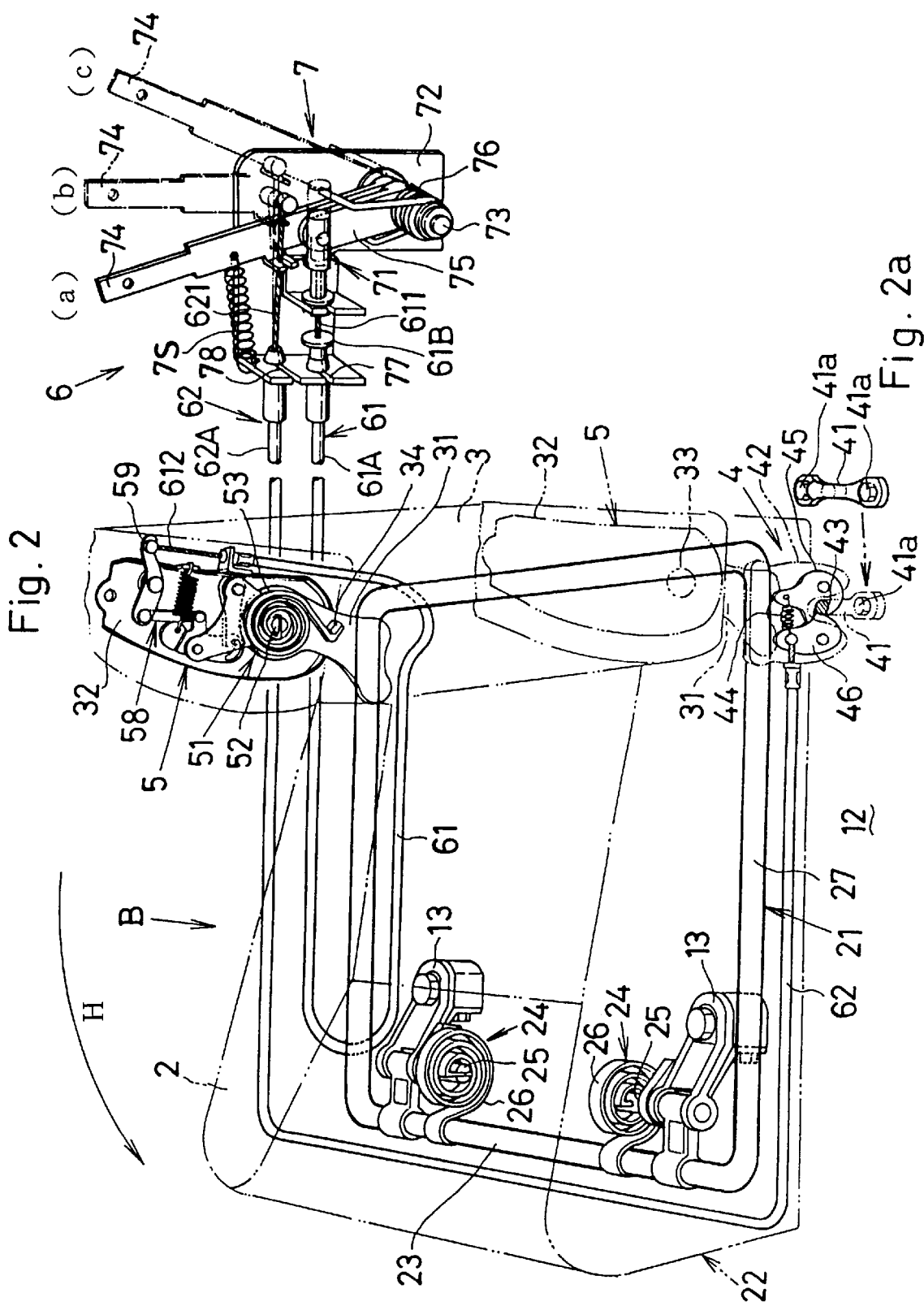
FIG. 2 is a schematic view of the foldable device for the recline seat of the automobile in the back seat compartment.
FIG. 2a is a perspective view of a metal hook with which a cross bar usually engages.

The seat 2 has a rectangular frame 21 and a cushion 22 provided on the frame 21 as shown in FIG. 2. A front arm 23 of the frame 21 is rotatably mounted on a pair of legs 13, 13 which are secured to the floor 12 by means of bolts. On the front arm 23 of the frame 21, a seat urging mechanism 24 is further provided to urge the seat 2 to rotate forward. A rear end of the frame 21 rests on the floor 12 with a seat locking mechanism 4 interconnected therein.

In the seat urging mechanism 24, a pin 25 is provided to extend crosswise from the leg 13. Around the crosswise pin 25, a helical coil spring 26 is provided whose one end is connected to the front arm 23 of the frame 21 to urge the seat 2 in such a direction as to rotate it forward around the pin 25 as shown by an arrow H in FIG. 2.

The seat locking mechanism 4 has an arcuate metal hook 41 physically secured to the floor 12 by means of bolts 41a, 41a as shown in FIG. 2a, and at the same time, having a side plate 42 attached to a lateral arm 27 of the frame 21. One end of the side plate 42 has a cross bar 43 which usually engages with the metal hook 41, and the other end of the side plate 42 has an engagement plate 45 swingably provided around a fulcrum to which one end of a coil spring 44 is connected.

On one end of the side plate 42, an operative structure is provided which rotates the engagement plate 45 to dislodge the cross bar 43 from the metal hook 41. On the other end of the side plate 42, an actuation plate 46 is rotationally provided around a fulcrum to which the other end of the coil spring 44 is connected.

To both lateral ends of the rear portion of the cushion 22, a seat side bracket 31 is connected although only one is shown by solid line. On a lower end of the back rest 3, a back bone side bracket 32 is provided so that the brackets 31, 32 are rotationally connected at a fulcrum 33. At an exterior end of the fulcrum 33, a reclining mechanism 5 is provided which incorporates a back rest urging mechanism 51 which urges the back rest 3 in a direction to rotate it forward. In the back rest urging mechanism 51 shown in FIG. 3, a pin 52 is provided to extend interior on the back bone side bracket 32. A helical coil spring 53 is provided whose one end is connected to the pin 52, and the other end of the spring 53 is connected to a hook portion 34 defined on the seat side bracket 31.

Figure 3:
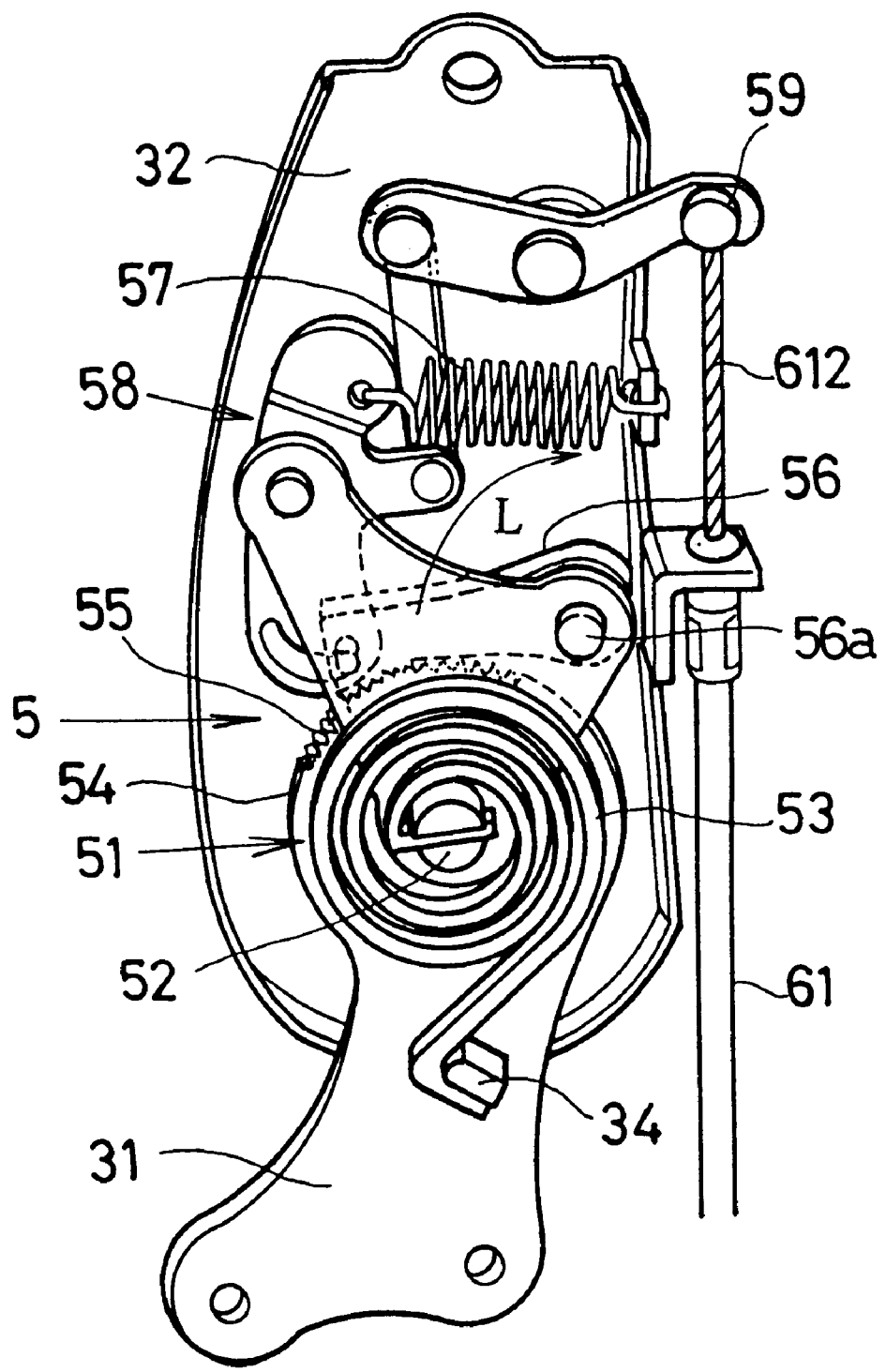
FIG. 3 is an elevational view of a reclining mechanism when a lock releasing cable is not operated.
Figure 4:
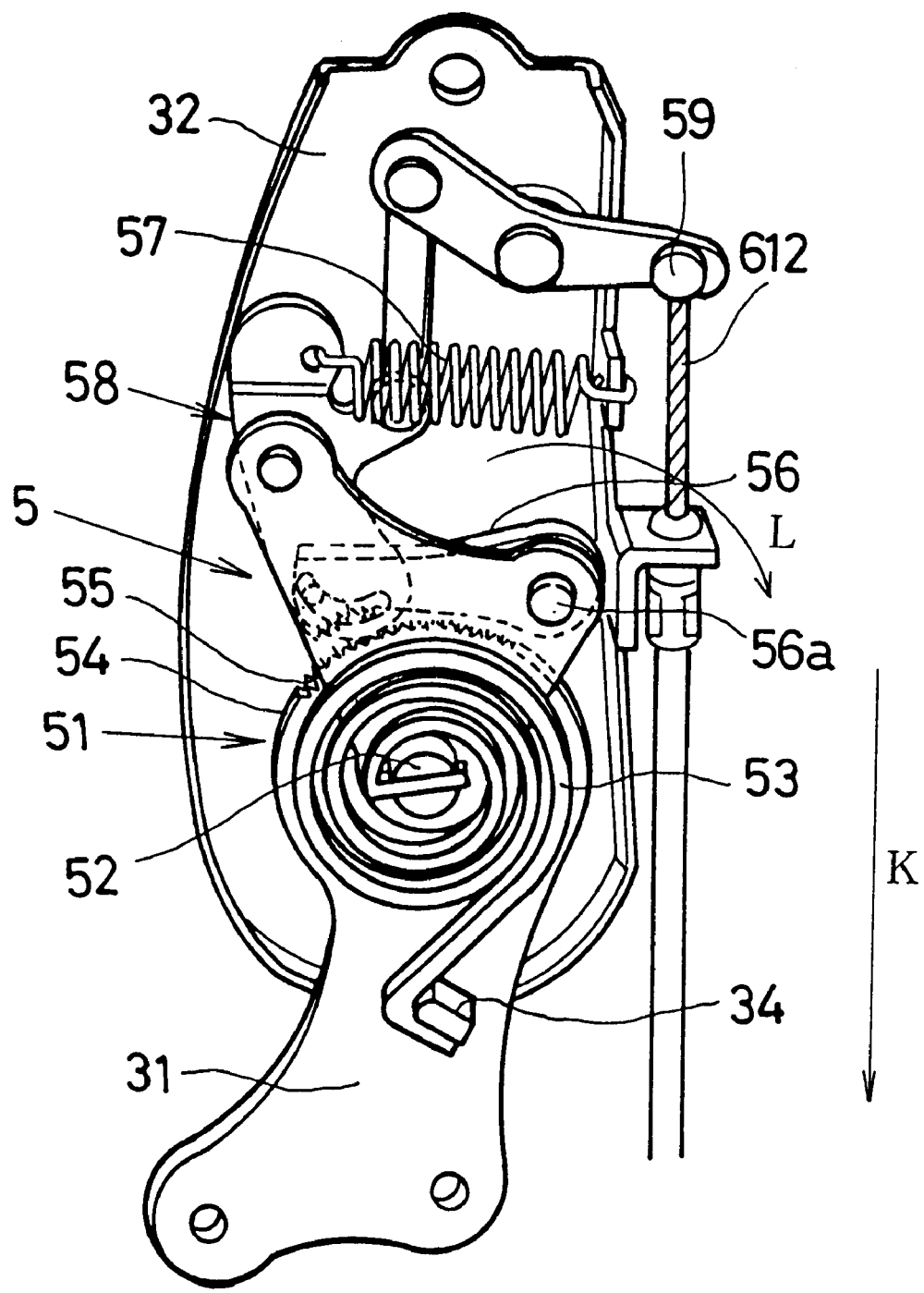
FIG. 4 is an elevational view of a reclining mechanism when the lock releasing cable is operated.

In the reclining mechanism 5 shown in FIGS. 3, 4, a toothed segment 55 is provided around an arcuate scallop 54 extended from an upper end of the seat side bracket 31. In the arcuate scallop 54 of the seat side bracket 31, a ratchet plate 56 is adapted to be brought into engagement with the toothed segment 55 which forms a linkage mechanism 58 with a coil spring 57. The back seat foldable device 1 includes the seat urging mechanism 24, the seat locking mechanism 4, the back rest urging mechanism 51 of the reclining mechanism 5 and an actuator mechanism 6 described just hereinafter.

The actuator mechanism 6 has an operative lever 7, a back rest lock releasing cable 61, a seat lock releasing cable 62 and a timing mechanism 71 provided to render the seat lock releasing cable 62 operative after actuating the back rest lock releasing cable 61. It is to be observed that the operative lever 7 may be provided on the floor in which the driver's seat is situated.

Figure 5:
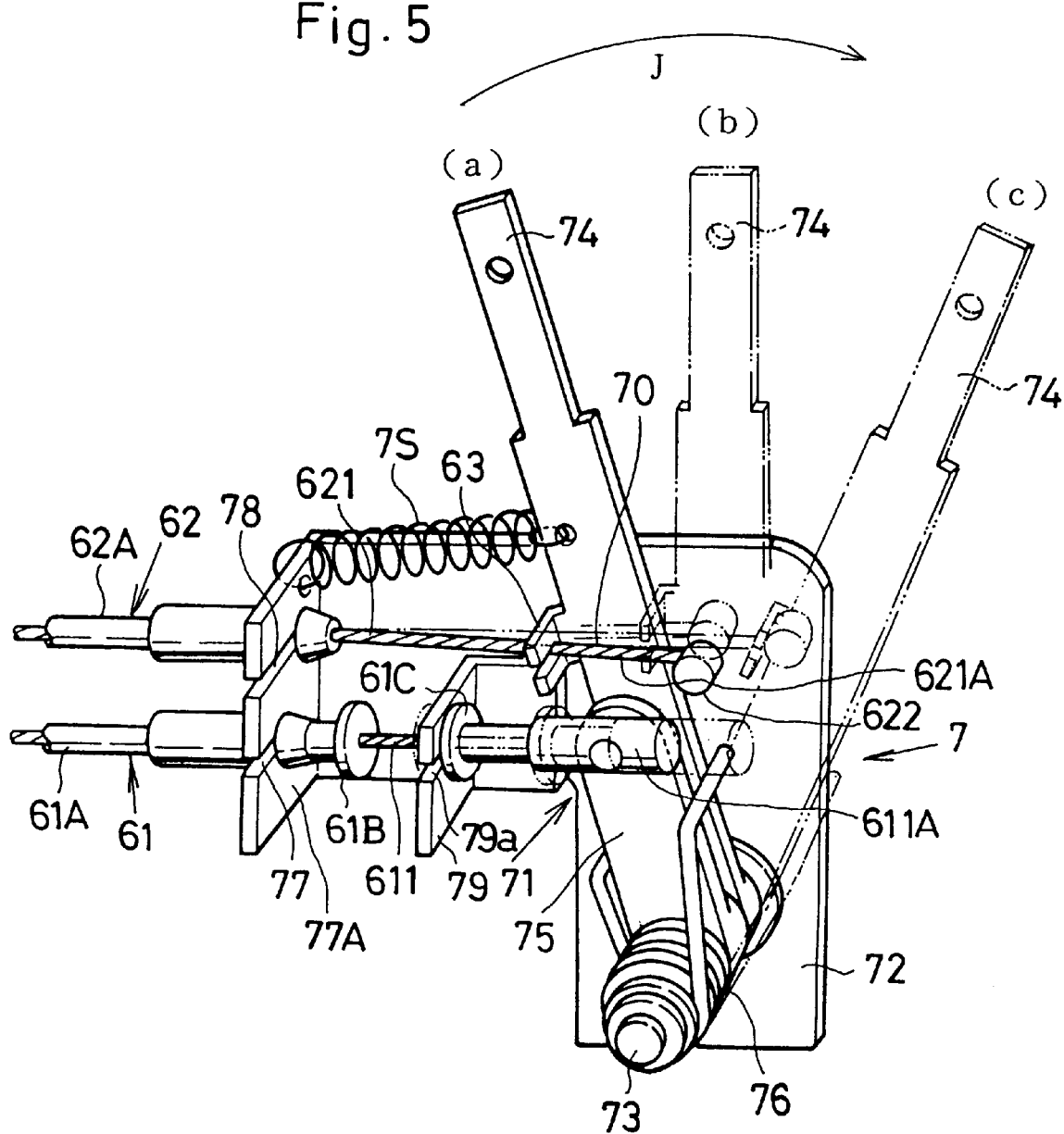
FIG. 5 is a perspective view of an actuator lever.

As shown in FIG. 5, the operative lever 7 has a bracket 72 secured to a chasis of the automobile, and having an actuator lever 74 whose lower end is pivotably connected to the bracket 72 by an axis pin 73. The operative lever 7 is always urged forward by a tensile coil spring 7S provided between the actuator lever 74 and a stud 77A extended inward from a front end of the bracket 72. An upper end of the actuator lever 74 has a grip (T) as shown in FIGS. 1a–1c. Around the axis pin 73, an auxiliary lever 75 is provided to be sandwiched between both ends of a torsion coil spring 76 together with the actuator lever 74 at the axis pin 73.

At the front end of the bracket 72, slit openings 77, 78 are provided on the stud 77A to hold outer cables 61A, 62A of the back rest lock releasing cable 61 and the seat lock releasing cable 62.

The back rest lock releasing cable 61 has an inner cable 611 whose one end 611A is connected to the auxiliary lever 75, and the other end 612 of the inner cable 611 is connected to a pin 59 of the linkage mechanism 58 as shown in FIGS. 3, 4. One end of the outer cable 61A is held by the slit opening 77 of the stud 77A at a stopper 61B, and one end of the inner cable 611 is held by a slit 79a of a stud 79 provided on the bracket 72 between the auxiliary lever 75 and the stud 77A. Then, the inner cable 611 is engages against the stud 79 at a stopper 61C.

The inner cable 621 of the seat lock releasing cable 62 has a redundant play length 70 at its extension line 621A which is slidably put between a forked claw 63 integrally projected inward from a middle portion of the actuator lever 74. With the actuator lever 74 pivotally moved rearward, an effective friction between the forked claw 63 and the extension line 621A gradually decreases so that the forked claw 63 starts to slide along the redundant play length 70 until the claw 70 engages against a stopper 622 which is provided on a rear distal end of the redundant play length 70. The redundant play length 70 forms the timing mechanism 71 in which the inner cable 611 is firstly pulled, and then the inner cable 621 is pulled after an elapse of a predetermined period of time when the actuator lever 74 is pivotally moved rearward as shown at an arrow J in FIG. 5.

With the structure thus far described, the actuator lever 74 is in a forward position as shown at solid line in FIGS. 1, 2, 5 when the back seat (B) is situated at a normal position. In this situation, the inner cable 611 of the back rest lock releasing cable 61 is in a position to engage the ratchet plate 56 with the toothed segment 55 of the arcuate scallop 54 extended from the upper end of the seat side bracket 31.

Upon pivotally moving the actuator lever 74 rearward in the direction of the arrow J by pulling the grip (T), the actuator lever 74 pivotally moves against the urging force of the spring 7S from a forward position (a) to a middle position (b) of FIG. 5 around the axis pin 73. With the pivotal movement of the actuator lever 74, the auxiliary lever 75 moves in the same direction with the action of the torsion coil spring 76 so as to pull the inner cable 611 so as to move the pin 59 downward in the direction of an arrow K of FIG. 4.

With the downward movement of the pin 59, the ratchet plate 56 moves around a pin 56a in the direction of an arrow L of FIG. 4 to release the ratchet plate 56 from the toothed segment 55 by way of the linkage mechanism 58. With the release of the ratchet plate 56 from the toothed segment 55, the back rest 3 is folded by falling on an upper surface of the seat 2 with the action of the back rest urging mechanism 51 as shown in FIG. 1b. In this instance, the forked claw 63 slides rearward along the redundant play length 70 until it engages against the extension line 621A, while at the same time, bringing the stopper 61B of the inner cable 611 into engagement with the stud 79.

Upon further pulling the actuator lever 74 rearward, the actuator lever 74 pivotally moves around the axis pin 73 against the urging force of the spring 7S from the middle position (b) to a rearward position (c) of FIGS. 2, 5. During the process in which the actuator lever 74 moves to the rearward position (c), the stopper 61B of the outer cable 61A engages against the stud 79 to hinder the further movement of the auxiliary lever 75 while pivotally moving the actuator lever 74 only against the urging force of the torsion coil spring 76 to the rearward position (c). With the actuator lever 74 moving to the rearward position (c), the seat urging mechanism 24 permits the actuation plate 46 to pivotally move it around the fulcrum to roll the seat 2 together with the back rest 3 until it positions near a back rest of a front seat as shown in FIG. 1c.

Referring further to FIGS. 6a–6c and 6–10 which show a hatch-back type automobile (Ao) according to a second embodiment of the invention, a foldable device 101 is applied to a back seat (Bo) within a back seat compartment of the five door automoble. The back seat (Bo) has a seat 102 mounted on a floor 112 of the automoble and having a back rest 103 which tiltably moves rearward to form a reclining seat structure.

The seat 102 has a rectangular frame 121 and a cushion 122 provided on the frame 121 as shown in FIG. 7. A front arm 123 of the frame 121 is rotatably mounted on a pair of legs 113, 113 which are secured to the floor 112 by means of bolts 113a, 113a. On the front arm 123 of the frame 121, a seat urging mechanism 124 is further provided to urge the seat 102 to rotate forward. A rear end of the frame 121 rests on the floor 112 with a seat locking mechanism 104 interconnected therein.

In the seat urging mechanism 124, a pin 125 is provided to extend crosswise from the leg 113. Around the crosswise pin 125, a helical coil spring 126 is provided whose one end is connected to the front arm 123 of the frame 121 to urge the seat 102 in such a direction as to rotate it forward around the pin 125 as shown by an arrow Ho in FIG. 7.

The seat locking mechanism 104 has a metal hook 141 physically secured to the floor 112 by means of bolts 141a, 141a as shown in FIG. 7a, and at the same time, having a side plate 142 attached to a lateral arm 127 of the frame 121. One end of the side plate 142 has a cross bar 143 which usually engages with the metal hook 141, and the other end of the side plate 142 has an engagement plate 145 swingably provided around a fulcrum to which one end of a coil spring 144 is connected.

On one end of the side plate 142, an operative structure is provided which rotates the engagement plate 145 to dislodge the cross bar 143 from the metal hook 141. On the other end of the side plate 142, an actuation plate 146 is rotationally provided around a fulcrum to which the other end of the coil spring 144 is connected.

To both lateral ends of the rear portion of the cushion 122, a seat side bracket 131 is connected although only one is shown by solid line. On a lower end of the back rest 103, a back bone side bracket 132 is provided so that the brackets 131, 132 are pivotably connected at a fulcrum 133. At an exterior end of the fulcrum 133, a reclining mechanism 105 is provided which incorporates a back rest urging mechanism 151 which urges the back rest 103 in a direction to rotate it forward. In the back rest urging mechanism 151 shown in FIG. 8, a pin 152 is provided to extend interior on the back bone side bracket 132. A helical coil spring 153 is provided whose one end is connected to the pin 152, and the other end of the spring 153 is connected to a hook portion 134 defined on the seat side bracket 131.

Figure 8:
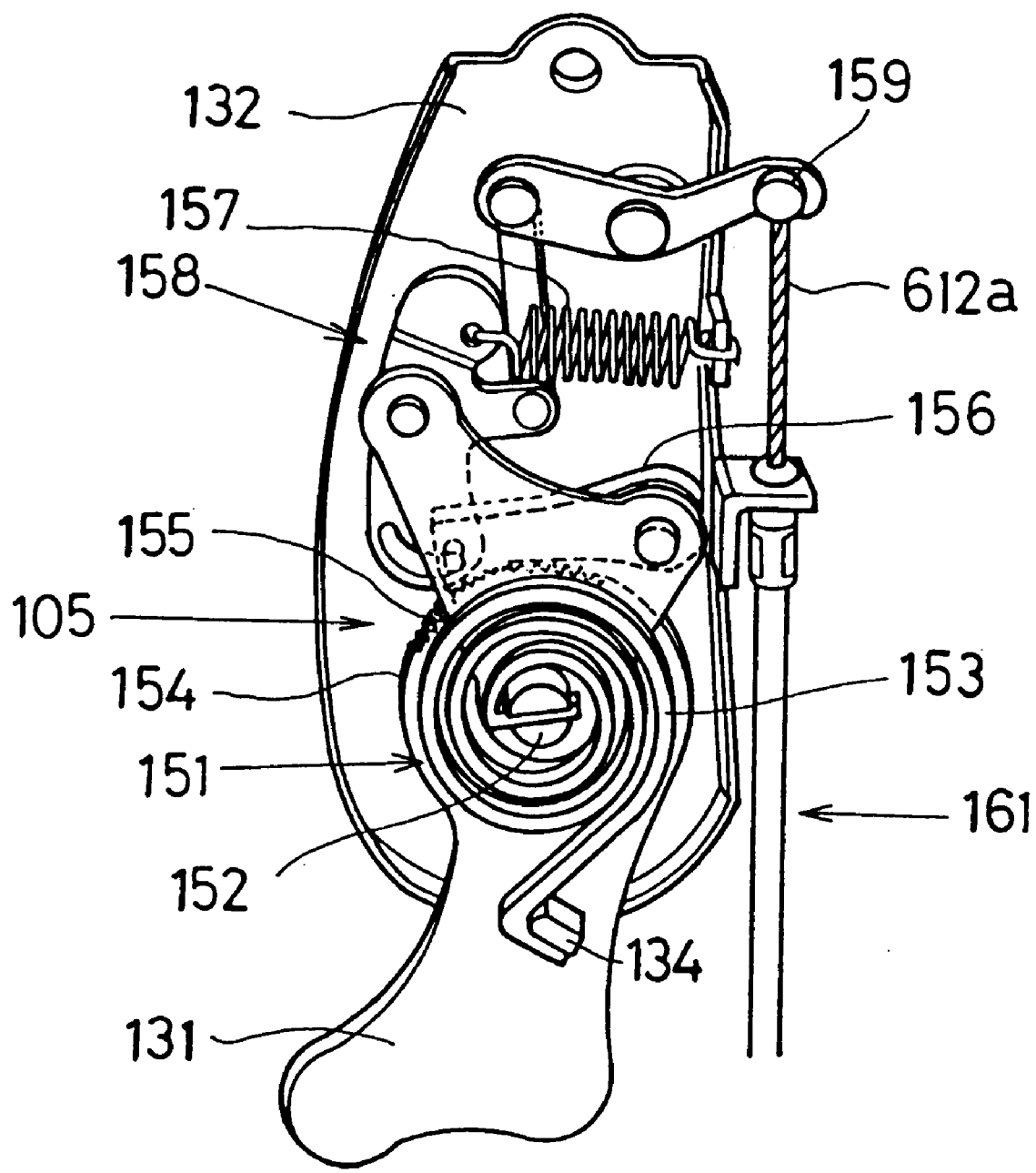
FIG. 8 is an elevational view of a reclining mechanism when a lock releasing cable is not operated.

In the reclining mechanism 105 shown in FIGS. 8. 9, a toothed segment 155 is provided around an arcuate scallop 154 extended from an upper end of the seat side bracket 131. In the arcuate scallop 154 of the seat side bracket 131, a ratchet plate 156 is adapted to be brought into engagement with the toothed segment 55 which forms a linkage mechanism 158 with a coil spring 157. The back seat foldable device 101 includes the seat urging mechanism 124, the seat locking mechanism 104, the back rest urging mechanism 151 of the reclining mechanism 105 and a lock releasing mechanism 106 described just hereinafter.

The lock releasing mechanism 106 has an operative lever 107, a back rest lock releasing cable 161 whose pulling force unlocks the reclining mechanism 105 and a follower mechanism 108 which releases the seat locking mechanism 104 by a pulling force of the back rest lock releasing cable 161. It is to be observed that the operative lever 107 may be provided on the floor in which the driver's seat is situated.

Figure 6A:
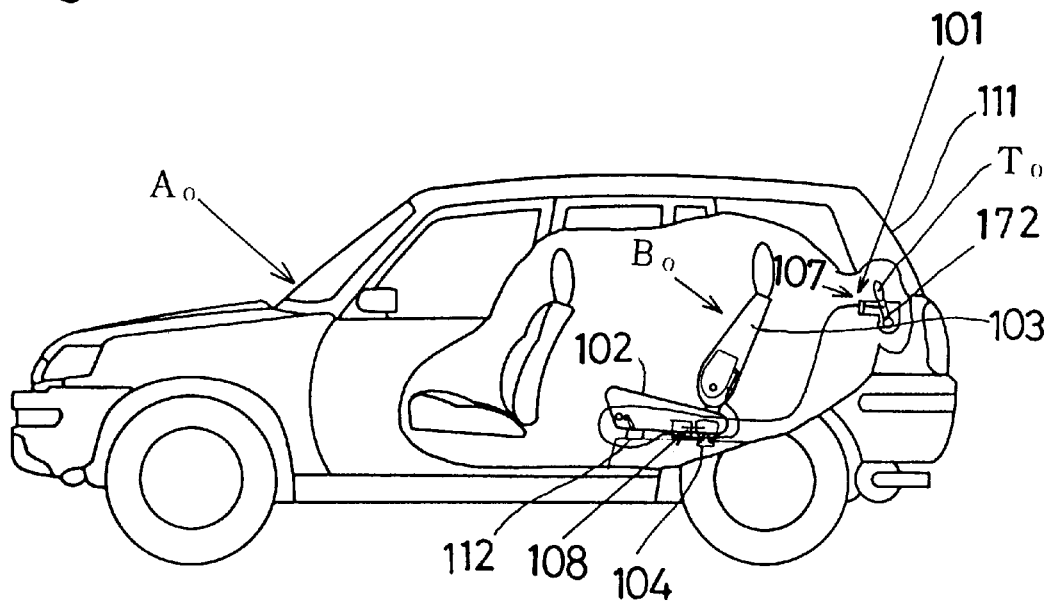
FIGS. 6a–6c are schematic views of a foldable device for a recline seat of an automobile in a back seat compartment according to a second embodiment of the invention.
Figure 6B:
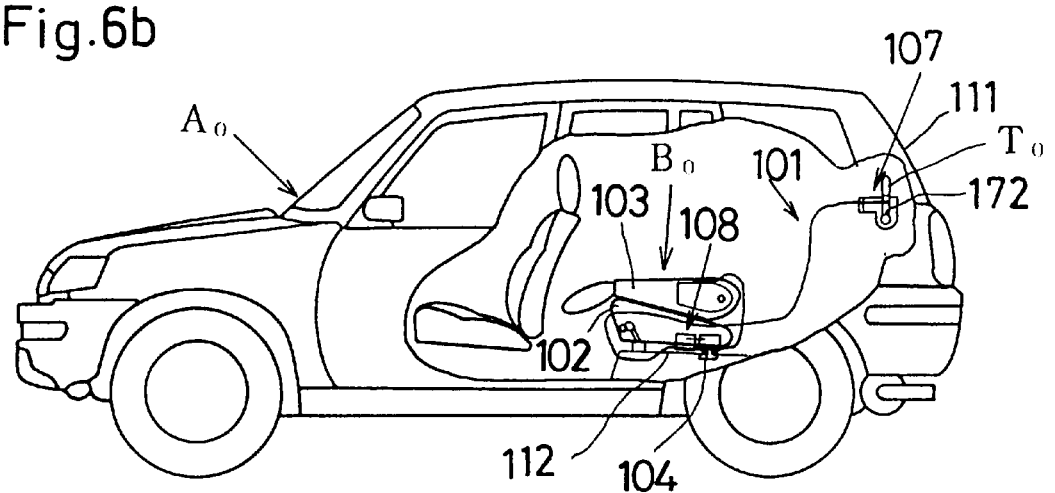
Figure 6C:
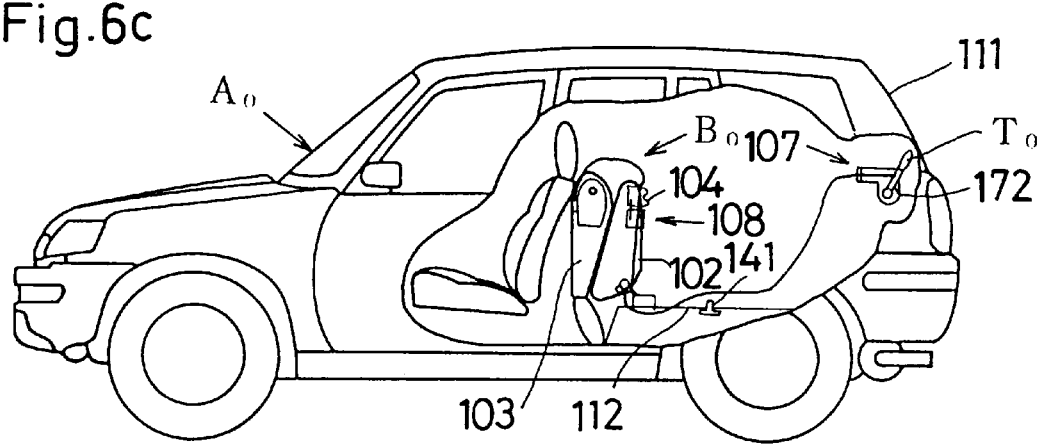

As shown in FIG. 10, the operative lever 107 has a bracket 170 secured to a chasis of the automobile, and having an actuator lever 172 whose lower end is pivotably connected to the bracket 170 by an axis pin 171. The operative lever 107 is always urged forward by a tensile coil spring 107S provided between the actuator lever 172 and a stud 173 extended inward from a front end of the bracket 170. An upper end of the actuator lever 172 has a grip (To) as shown in FIGS. 6a–6c.

At the front end of the bracket 170, a slit opening 173a is provided on the stud 173 to hold an outer cable 161A of the back rest lock releasing cable 161.

The back rest lock releasing cable 161 has an outer cable 161A and an inner cable 611a coaxially enclosed within the outer cable 161A.

One end of the inner cable 611a is put through a forked claw 162 which is provided on a middle portion of the actuator lever 172, and the other end 612a of the inner cable 611a is connected to a pin 159 of the linkage mechanism 158 as shown in FIGS. 8. 9. One end of the outer cable 161A is held by the slit opening 173a of the stud 173 at a stopper 161B, and one end of the inner cable 611a is held by the forked claw 162 at a stopper 611B. Around a middle length portion of the inner cable 611a, an annular tube 180 encircles to transmit a pulling force to the follower mechanism 108. The annular tube 180 has a flange which pushes the follower mechanism 108 to render it operative.

As shown in FIG. 7, the follower mechanism 108 has a half frame 181 and two guide tubes 182, 182 provided exterior of the half frame 181 to hold the outer cable 161A while guiding the inner cable 611a. The follower mechanism 108 further has a displacement plate 183 provided on the half frame 181 to move with a pulling force of the back rest lock releasing cable 161, and at the same time, having a follower cable 184 which connects the displacement plate 183 to the actuation plate 146 of the seat locking mechanism 104 so as to pull the displacement plate 183.

The half frame 181 has a side wall M secured to the lateral arm 127 of the frame 121, and a front guide wall F which is extended from the side wall M to hold one of the guide tubes 182, 182. The half frame 181 further has a rear guide wall E which is extended from the side wall M to hold another guide tube 182, and the rear guide wall E having a notch to introduce the follower cable 184.

The angular displacement plate 183 has a length corresponding to that of the half frame 181, and is placed on a middle portion of the side wall M. The angular displacement plate 183 has a vertical side 185 and a lateral side 186 which is pivoted to the side wall M by means of a pin P so as to swing like a pendulum. The vertical side 185 of the displacement plate 183 has first, second notches (h1, h2) which in turn introduces the inner cable 611a and the follower cable 184.

In this situation, the back rest lock releasing cable 161 is in a position to be introduced by the first notch (h1) and the guide tubes 182, 182, while the annular tube 180 positions between the displacement plate 183 and the rear guide wall E. A leading end of the follower cable 184 has a stopper 187 to block the cable 184 from sliping out of the second notch (h2).

With the structure thus described, the actuator lever 172 is in a forward position as shown at solid line in FIGS. 1, 2, 5 when the back seat (Bo) is situated at a normal position. In this situation, the inner cable 611a of the back rest lock releasing cable 161 is in a position to engage the ratchet palte 156 with the toothed segment 155 of the arcuate scallop 154 extended from the upper end of the seat side bracket 131.

Upon pivotally moving the actuator lever 172 rearward in the direction of an arrow Jo by touching the grip (To), the actuator lever 172 pivots against the urging force of the spring 107S from a forward position (a) to a middle position (b) of FIG. 10 around the axis pin 171. With the pivotal movement of the actuator lever 172, the 172 pulls the inner cable 611a to move the pin 159 downward in the direction of an arrow Ko of FIG. 9.

Figure 9:
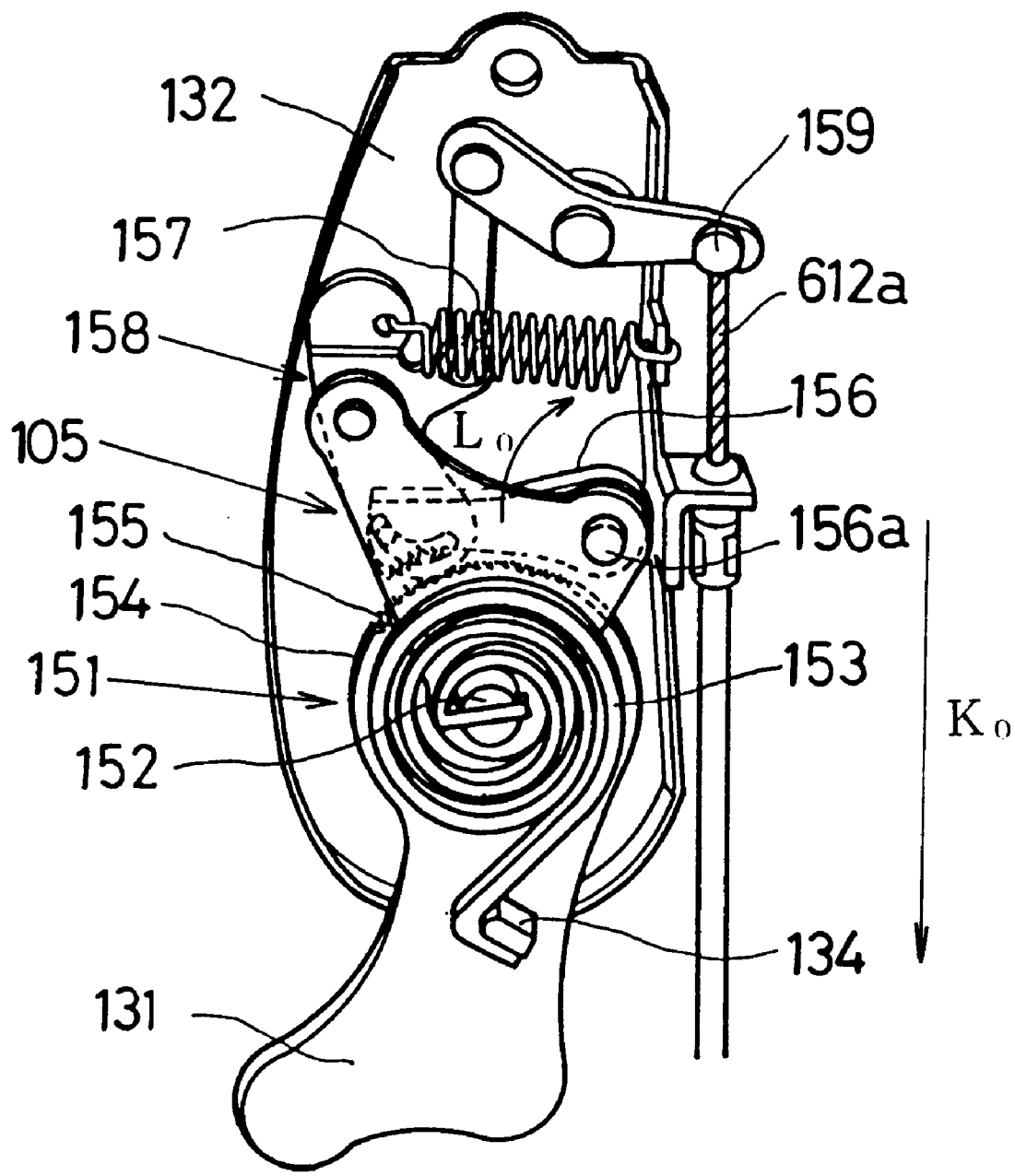
FIG. 9 is an elevational view of a reclining mechanism when the lock releasing cable is operated.

With the downward movement of the pin 159, the ratchet plate 156 moves around a pin 156a in the direction of an arrow Lo of FIG. 9 to release the ratchet plate 156 from the toothed segment 155 by way of the linkage mechanism 158. With the release of the ratchet plate 156 from the toothed segment 155, the back rest 103 is folded by falling on an upper surface of the seat 102 with the action of the back rest urging mechanism 151 as shown in FIG. 6b. In this instance, the seat locking mechanism 104 holds effective because the annular tube 180 remains yet free from the engagement with the displacement plate 183.

Upon further pulling the actuator lever 172 rearward, the actuator lever 172 pivots around the axis pin 171 against the urging force of the spring 107S from the middle position (b) to a rearward position (c) of FIGS. 7, 10. With the movement of the actuator lever 172 toward the rearward position (c), the annular tube 180 moves forward to push the displacement plate 183 so as to pull the actuation plate 146, and thereby pivoting the actuation plate 146 around the fulcrum so as to pivotally move the engagement plate 145 by the action of the coil spring 144. This dislodges the metal hook 141 from the cross bar 143, and thus permitting the seat urging mechanism 124 to act to roll the seat 102 together with the back rest 103 until it positions near a back rest of a front seat as shown in FIG. 6c.

According to the second embodiment of the invention, it is possible to connect the operative lever 107 to the lock releasing mechanism with a single back rest lock releasing cable 161 so as to make the foldable device compact with a lesser occupancy space.

It is noted that the foldable device is applied to a front passenger seat and a middle passenger seat instead of the back seat.

It is also noted that an operation rod may be provided between the actuator lever 172 and the back rest lock releasing cable 161.

It is appreciated that an operation rod may be used in lieu of the follower cable 184.

It is observed that a manual grip may be used to pull the back rest lock releasing cable 161 instead of the actuator lever 172.

While the invention has been described with reference to the specific embodiments, it is understood that this description is not to be construed in a limitting sense in as much as various modifications and additions to the specific embodiments may be made by skilled artisan without departing the scope of the invention.

What is claimed is:

1. In a foldable device for a recline seat which is provided on a floor of an automobile, the seat having a back rest rotationally provided around a hinge installed on a rear portion of the seat;

the foldable device for the recline seat comprising:
an urging means provided between a front portion of the seat and the floor of the automobile to always urgingly rotate the seat forward around a front arm of a frame which is secured to a front portion of the seat;
a seat locking means provided to detachably mount the rear portion of the seat on the floor of the automobile;
a back rest urging means provided between the seat and the back rest to urgingly rotate the back rest forward;
a back rest reclining means provided to lock the back rest and to release the back rest to rotate forward by the back rest urging means;
a seat lock-up cable which is connected at one end to the seat locking means and the other end to an actuator means; back rest lock-up cable which is connected at one end to the back rest reclining means and the other end to the actuator means, the actuator means including an actuator lever and an auxiliary lever; and
a timing means provided to sequentially actuate the actuator lever and the auxiliary lever so as to pull an inner cable of the back rest lock-up cable and in inner cable of the seat lock-up cable in turn, releasing the back rest reclining means and the seat locking means, respectively, to rotate the back rest forward by the back rest reclining means and rotating the seat forward around the front arm of the frame by an action of the urging means.

2. The foldable device for the recline seat as recited in claim 1, wherein the actuator means is an operative lever including the actuator lever and the auxiliary lever, and is provided on a driver seat or in the proximity of a back door of an automobile.

3. The foldable device for the recline seat as recited in claim 1, wherein the timing means gives the actuator lever a redundant play so that the auxiliary lever can pull the inner cable of the back rest lock-up cable before the actuator lever pulls the inner cable of the seat lock-up cable.

4. A foldable device for a recline seat as recited in claim 1, wherein the back rest lock-up cable has an inner cable and an outer cable, the outer cable being held by a stud provided near the actuator means so that operation of the actuator means is hindered by the outer cable, and the inner cable being pulled by the actuator means to release the back rest locking means.

* * * * *